No. 704,972. Patented July 15, 1902.
F. T. GRIFFITH.
TEMPERATURE PRESERVING BOTTLE COVER.
(Application filed July 5, 1901.)
(No Model.)
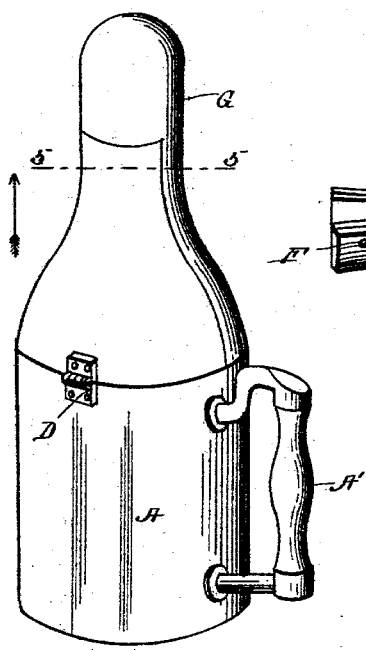
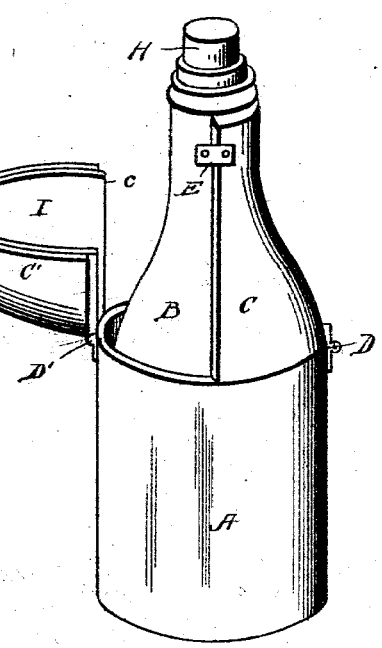
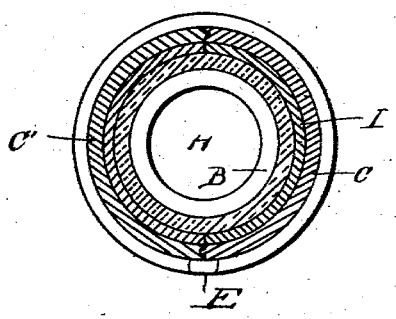
Witnesses
Bernard M. Offutt
M. W. Johnson.
Inventor
Frederick T. Griffith,
by David P. Moore,
Attorney
THE NORRIS PETERS CO., PHOTO-LITHO., WASHINGTON, D. C.

UNITED STATES PATENT OFFICE.

FREDERICK T. GRIFFITH, OF LOS ANGELES, CALIFORNIA.

TEMPERATURE-PRESERVING BOTTLE-COVER.

SPECIFICATION forming part of Letters Patent No. 704,972, dated July 15, 1902.

Application filed July 5, 1901. Serial No. 67,240. (No model.)

*To all whom it may concern:*

Be it known that I, FREDERICK T. GRIFFITH, a citizen of the United States, residing at Los Angeles, in the county of Los Angeles, State of California, have invented new and useful Improvements in Temperature-Preserving Bottle-Covers, of which the following is a specification.

My invention relates to a removable cover for bottles to retain the temperature in the contents of the bottle while the same is being served; and the objects thereof are to provide a convenient cover which can be easily put on and taken off a bottle and which will retain the same temperature of the contents while the same is being served as it has when put in the cover and which provides a convenient means for handling the bottle.

In serving wines, such as champagne, it is very desirable that the wine be served cold. To that end the wine in the bottle is put on ice, and when served it is usually wrapped in a napkin to retain as near as possible the temperature which it had when taken off the ice. This mode of handling the bottle is very crude and unsatisfactory, as the napkin will slip on the bottle and sometimes the bottle will fall and break, and it is very difficult to so wrap it that the temperature is retained. With my improved bottle-cover these difficulties are overcome.

In the drawings I have illustrated three different forms of covers.

Figure 1 is a side elevation of my cover inclosing a bottle. Fig. 2 is a view with the cap removed and the top portion partly open. Fig. 3 is a cross-section on line 5 5 of Fig. 1 looking in the direction of the arrow.

In the drawings, A is the body of my bottle-cover, cup-shaped form, into which the bottle B is placed. It is provided with a handle A'. The upper or neck portion of the cover is divided into two equal parts C and C', which are connected to the body portion by hinges D and D'. These portions are provided with projecting flanges c, which make a lap-joint with the body. Where these sections come together, they are tongue-and-grooved to make a tight joint. Part C is provided with a spring-catch E, which springs over stud F on part C' and holds the two sections from separating when the cap G is taken off to permit the liquor to be poured from the bottle, cork H being first removed. The interior of the cover, both the body and the top portions, is coated with any heat-insulating material I, such as the heat-insulating paint described in the patent issued to Jacob Hommel December 18, 1900, No. 664,154, or it may be lined with any heat-insulating fabric, such as asbestos-cloth, flannel, &c. By this construction it will be seen that beer, wines, liquors, or other beverages in glass bottles may be kept either cold or warm during the time they are being used at table and the liquids may be poured from the bottles conveniently and with ease and less liability of spilling.

The cover is made to fit any sized bottle and of any suitable material. I prefer aluminium on account of its light weight and beauty. My cover is also adapted for use on kegs, barrels, and other liquid-receptacles, the cover being of a suitable form.

Having described my invention, what I claim as new, and desire to secure by Letters Patent, is—

1. A bottle cover or casing comprising a cup-shaped body or lower portion, a pair of oppositely-arranged portions constituting the neck of the casing when together hinged to the top of the body upon opposite sides, and a removable cap adapted to cover and surround the upper ends of said portions when together.

2. A bottle cover or case, lined with a heat-non-conducting material and comprising a lower cup-shaped body a pair of portions constituting the neck of the case hinged upon opposite sides of the body and provided with flanges upon their lower edges to lap over the upper edge of the body, catches to hold the portions together, and a cap to fit over the upper ends of the portions.

3. A bottle cover or case, comprising a lower portion or body provided with a handle, a neck formed in two equal portions each of which are hinged upon opposite sides of the body and adapted to swing outward to admit a bottle to the body, said portions being provided with tongue-and-groove edges, catches to hold the portions together, and a cap to fit over them when together.

In witness that I claim the foregoing I have hereunto subscribed my name this 28th day of June, 1901.

FREDERICK T. GRIFFITH.

Witnesses:
G. E. HARPHAM,
M. S. MCLEAN.